UNITED STATES PATENT OFFICE.

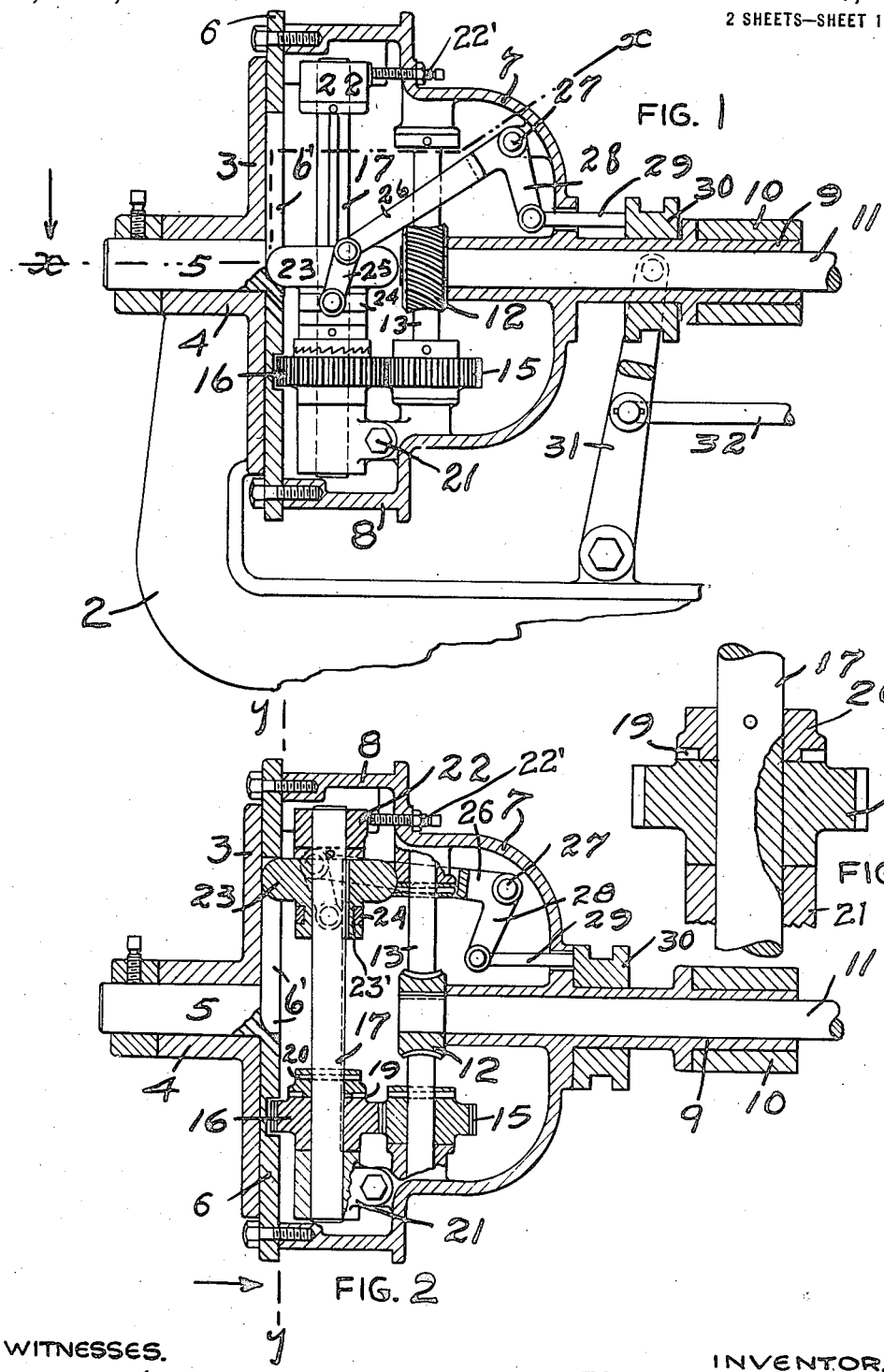

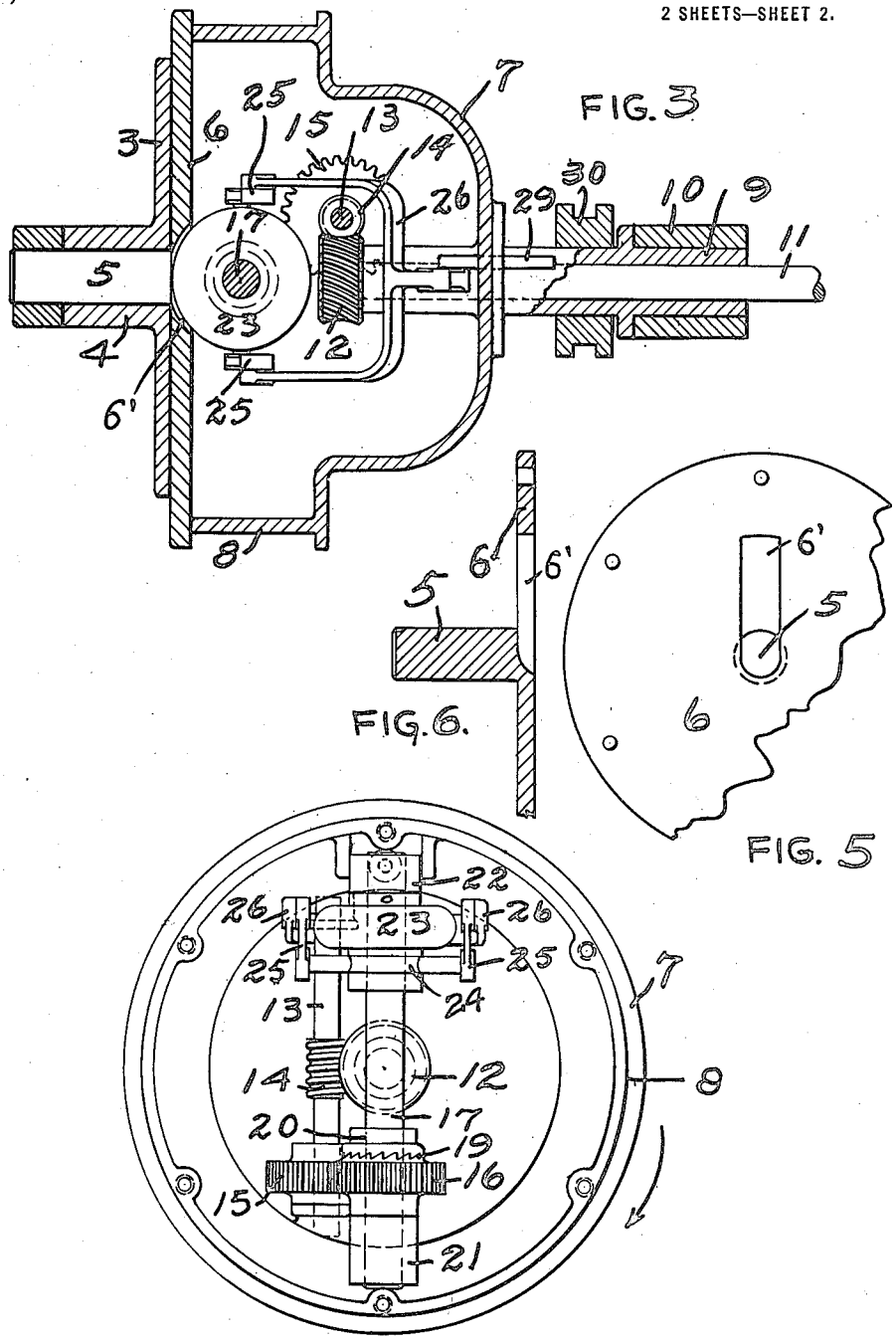

EDWIN GUSTAVE STAUDE, OF MINNEAPOLIS, MINNESOTA, ASSIGNOR TO E. G. STAUDE MANUFACTURING CO., OF MINNEAPOLIS, MINNESOTA, A CORPORATION.

VARIABLE-SPEED GEARING.

1,220,373.

Specification of Letters Patent.

Patented Mar. 27, 1917.

Application filed October 24, 1910. Serial No. 588,917.

*To all whom it may concern:*

Be it known that I, EDWIN G. STAUDE, of Minneapolis, Hennepin county, Minnesota, have invented certain new and useful Improvements in Variable-Speed Gearing, of which the following is a specification.

The primary object of my invention is to provide a positive variable speed gearing which may be utilized as a direct drive when high speed is required.

A further object is to provide a speed controlling mechanism capable of not only acting as a power transmitter, but for positively governing the speed of the driven member.

The invention consists generally in various constructions and combinations, all as hereinafter described and particularly pointed out in the claims.

In the accompanying drawings forming part of this specification,

Figure 1 is a vertical section of the variable speed gearing embodying my invention, Fig. 2 is a similar view showing the speed controller shifted to its opposite position, Fig. 3 is a section on the line x—x of Fig. 1, Fig. 4 is a section on the line y—y of Fig. 2, looking in the direction of the arrow, Figs. 5, 6 and 7 are details.

In the drawing I have shown a suitable frame 2 having a circular disk 3, the center of this disk being provided with a bearing 4. The disk and bearing may be cast integrally with the frame or separately secured thereto.

Mounted in the bearing 4 is a driving shaft 5 having a plate 6 secured to its inner end and to the plate 6 is secured a casting 7, which acts as a housing for the mechanism and also provides a surface 8 for a belt. (Not shown.)

On the housing 7 I form a hollow shaft 9 which operates in a bearing 10. This bearing 10 may be a part of the frame 2. In the hollow shaft 9 I mount a driven shaft 11.

The shaft 11 has a worm wheel 12 mounted on its inner end. At right angles to the shaft 11 I mount a shaft 13 carrying a worm 14. This worm meshes in the worm wheel 12, and prevents the rotation of the worm wheel 12, except as permitted by the rotation of the shaft 13.

From the construction so far described, it is evident that should I secure the shaft 13 and prevent it from revolving and apply a belt on the surface 8, I would have a direct drive, revolving the shaft 11 at the same speed as the housing 7. In order to vary this speed so that I may even revolve the housing 7 without rotating the shaft 11, and still maintain a positive drive, I provide a gear 15 on the shaft 13 meshing into a similar gear 16, which is mounted on a shaft 17. The gear 16 is loose on the shaft 17 and free to revolve with the gear 15. On the gear 16 I provide a series of inclined surfaces 19 co-acting with similar inclined surfaces on a collar 20 which is secured to the shaft 17. The shaft 17 is provided with a pivoted bearing 21 at one end and an adjustable bearing 22 at the opposite end. This bearing is moved toward the stationary disk by the screw 22′. Between these bearings I mount a friction wheel 23, splined on the shaft 17 to revolve with it and slide into the various positions required by the controlling lever. The engagement of the inclined surfaces 19 with one another will cause sufficient friction between the gear 16 and the bearing 21 to exert a braking effect.

The friction wheel 23 operates against the surface of the stationary disk 3 and in order to regulate the various positions of the friction wheel 23, I provide a groove 23′ in the hub of the friction wheel and mount in this groove a ring 24.

Links 25 are attached to pins forming a part of the ring 24 and these links are connected to a yoke 26 having a pivot 27 and a depending arm 28. To the arm 28 I attach a rod 29, which is secured to the collar 30. This collar 30 is slidable on the hollow shaft 9 and is operated by the fork 31 and the rod 32.

While I have shown on housing 7 the provision for a belt at the point 8, I may also drive the gearing by connecting power to the shaft 5.

The operation of a variable speed gearing is as follows:—

Assuming that the friction wheel is in the position shown in Fig. 2 and the housing 7 rotating in the direction shown by the arrow in Fig. 4, the contact of the friction wheel 23 on the stationary surface of the disk 3 will revolve the friction wheel and with it the shaft 17, also the gear 16 which, in turn, revolves the gear 15, shaft 13 and the worm at a speed sufficient to permit the rotation of the housing 7 without turning the worm wheel 12, and the shaft 11, therefore, will remain stationary.

By moving the collar 30 and operating the yoke 26, the friction wheel 23 will slide toward the center and will decrease in speed of revolution, and since the housing 7 will operate at the same speed, it follows that the shaft 11 must revolve at a speed equal to the difference of the two speeds. As the friction wheel 23 is moved nearer the center, the speed of the worm wheel 12 and the shaft 11 will increase and when the wheel 23 is moved out of contact with the disk 3, the rotation of the shaft 17 will cease entirely and the shaft 11 will be driven at the same speed as the shaft 5 without rotating any of the other mechanism. In this position the gearing is set as a direct drive.

It must be borne in mind that the friction wheel 23 does not transmit power but merely acts as a controller, and to prevent the tendency of the worm wheel 12 to overload the friction wheel 23 and cause it to slip on the surface of the disk 3, I provide a worm wheel of such size and proportion that the angle of the worm will be sufficient, together with the end thrust, to develop sufficient friction to barely cause the shaft 13 to revolve. This will transmit motion to the gear 16 and should the backward strain of the load be sufficient to cause the gear 16 to revolve faster than the friction wheel 23 and cause slippage of the wheel, the downward pull on the wheel 16 through the engagement of its inclined surfaces 19 with those on the collars 20 will produce sufficient friction to check the shaft 17 and prevent further rotation until the friction wheel 23 advances and allows the inclined surfaces to become separated.

Since this braking action is entirely automatic, it can readily be seen the function of the friction wheel 23 is merely to relieve the friction caused by the surfaces 19 and assist in revolving or retarding the motion of the shaft 13, regardless of whatever load may be driven by the shaft 11.

For the purpose of illustration, I have shown the friction wheel 23 operating through a slot 6' on the disk 6, but it is immaterial whether I employ a slotted disk or provide a wheel with spokes.

In view of the fact that so little power is required to operate the disk 23, I have been very successful in making the wheel 23 and the disk 3 out of chilled iron, and upon filling up the housing 7 with the suitable heavy lubricant, I find that reasonable pressure of the wheel on the hard surface of the disk 3 will cause it to revolve and perform its functions even though the surface is constantly covered with such lubricant.

I do not confine this invention to the precise construction shown herein, as I may dispense with the worm and provide a spur or bevel gear construction and may even mount the friction wheel 23 in such a manner as to transmit the load entirely, or I may dispense with the brake retarding device 19 and secure the gear 16 against lateral motion, or I may even provide the friction wheel 23 on the shaft 13 and dispense with both the gears 16 and 15, all of which does not in any sense deviate from the principal feature of this invention.

I claim as my invention:—

1. A gearing comprising a driving member, a stationary friction disk, a shaft mounted to revolve with said member in a plane parallel substantially with the plane of said disk, a friction wheel splined on said shaft to contact with said disk, a driven shaft, a worm thereon, a screw meshing with said worm and mounted to revolve with said driving member around said worm, and a driving connection between said screw and said friction wheel shaft.

2. A gearing comprising a driving member, a stationary friction disk, a moving disk carried by said driving member and having a radial slot therein, a shaft mounted to revolve with said driving member in a plane parallel substantially with the plane of said stationary disk, a friction wheel splined on said shaft and arranged to contact with said stationary disk through said radial slot, means for sliding said friction wheel on said shaft, a driven shaft, a worm thereon, a screw meshing with said worm and mounted to revolve with said driving member around said worm and a driving connection between said screw and said friction wheel shaft.

3. A gearing comprising a driving member, a stationary friction disk, a second disk carried by said driving member and having a radial slot therein, a shaft mounted to revolve with said member in a plane parallel substantially with the plane of said stationary disk, a friction wheel splined on said shaft and means for moving said wheel, the periphery of said wheel projecting into said radial slot to contact with said stationary disk, a driven shaft, and a driving connection between said friction wheel shaft and said driven shaft.

4. A gearing comprising a driving member, a stationary friction disk, a pivoted shaft mounted to revolve with said member in a plane parallel substantially with the plane of said disk, said shaft being capable of swinging toward or from said disk, a friction wheel splined on said shaft to contact with said disk, a driven shaft and a driving connection between said friction wheel shaft and said driven shaft.

5. A gearing comprising a driving member, a stationary friction disk, a shaft pivoted at one end and mounted to revolve with said member, means for moving the opposite end of said shaft toward said disk, a friction wheel splined on said shaft to contact with said disk, means for moving said friction wheel toward or from the center of said disk, a driven shaft and a driving connection also carried by said driving member connecting said friction wheel shaft and said driven shaft.

6. A gearing comprising a driving member, a stationary friction disk, a housing carried by said driving member, a shaft mounted in said housing to revolve therewith in a plane parallel substantially with the surface of said friction disk, a friction wheel splined on said shaft to contact with said disk, means for moving said friction wheel toward or from the center of said disk, a driven shaft, a worm wheel mounted thereon, a screw carried by said housing and meshing with said worm wheel and having a driving connection with said friction wheel shaft, substantially as described.

7. A gearing comprising a driving member, a stationary friction disk, a shaft mounted to revolve with said member in a plane parallel substantially with the plane of said disk, a friction wheel splined on said shaft to contact with said disk, means for sliding said friction wheel on said shaft toward or from the center of said disk, a driven shaft, a worm mounted thereon, a screw mounted to revolve with said driving member and meshing with said worm and having a driving connection with said friction wheel shaft, said friction wheel moving out of contact with said stationary disk at the center thereof and permitting a direct drive between said driving member and said driven shaft.

8. A gearing comprising a driving member, a stationary friction disk, a shaft mounted to revolve with said member in a plane parallel substantially with the plane of said disk, a friction wheel splined on said shaft to contact with said disk, an operating means for said wheel, a driven shaft, a worm thereon, a screw meshing with said worm and mounted to revolve with said driving member around said worm, and a driving connection between said screw and said friction wheel shaft, said driving means being constructed to act as a brake when backward strain of the load is sufficient to cause slippage of said wheel.

9. A gearing comprising a driving member, a stationary friction disk, a shaft mounted to revolve with said driving member in a plane parallel substantially with said disk, a friction wheel mounted to slide on said shaft and contact with said disk and having an operating means, a gear secured on said shaft and having an inclined surface constructed to engage a corresponding surface carried by said shaft when a backward strain is applied to said gear, a driven shaft, and driving connections between said driven shaft and said gear, said inclined surfaces operating under a predetermined strain of the load on said driven shaft to force said gear downward and check the revolution of said friction wheel shaft.

10. A gearing comprising a driving element, a driven element, a positive driving means connecting said driving element with said driven element, and a variable speed controlling mechanism having a driving connection with said positive driving means, said driving connection having means operating as a brake when backward strain of the load is sufficient to cause slippage of said controlling mechanism.

11. A gearing comprising a driving element, a driven element, a positive driving means between said driving element and said driven element, a stationary member having a friction surface, a speed controlling wheel operated from said driving element and adapted to engage said surface and movable thereon from the center of said driving element radially with respect thereto, and means operatively connecting said speed controlling wheel with said positive driving means.

12. A gearing comprising a driving element, a driven element, a worm wheel thereon, a screw meshing with said wheel and having a direct driving connection with said driving element to revolve around said wheel, a speed controlling mechanism geared to said screw and operated by said driving element.

13. A gearing comprising a driving member, a driven element, a member having a direct driving connection with said driving member and revolving around said driven element, and a speed controlling device having a driving connection with said member, said driving connection having means operating as a brake when backward strain of the load is sufficient to cause slippage of said controlling device.

In witness whereof, I have hereunto set my hand this 20" day of October, 1910.

EDWIN GUSTAVE STAUDE.

Witnesses:
 G. E. SORENSEN,
 E. A. PAUL.